F. B. McKENNEY.
CARRIER FOR EGGS AND OTHER PRODUCTS.
APPLICATION FILED JAN. 22, 1914.

1,123,565.

Patented Jan. 5, 1915.

F. B. McKenney,
Inventor

UNITED STATES PATENT OFFICE.

FRANK B. McKENNEY, OF WESTON, WEST VIRGINIA, ASSIGNOR TO MATHEW S. HOLT, OF WESTON, WEST VIRGINIA.

CARRIER FOR EGGS AND OTHER PRODUCTS.

1,123,565. Specification of Letters Patent. Patented Jan. 5, 1915.

Application filed January 22, 1914. Serial No. 813,731.

*To all whom it may concern:*

Be it known that I, FRANK B. McKENNEY, a citizen of the United States, residing at Weston, in the county of Lewis and State of West Virginia, have invented a new and useful Carrier for Eggs and other Products, of which the following is a specification.

The present invention appertains to a carrier for eggs, and other commodities, and aims to provide a novel and improved device for transmitting eggs, butter and other commodities by parcel post, express and the like.

Another object of the present invention is to provide a carrier including a novel cell structure for the eggs and other commodities, the cells being sealed to confine the eggs therein, and to exclude the elements, and to further hold the eggs in a perfect state of preservation, should the eggs become accidentally broken while in transit.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein—

Figure 1:
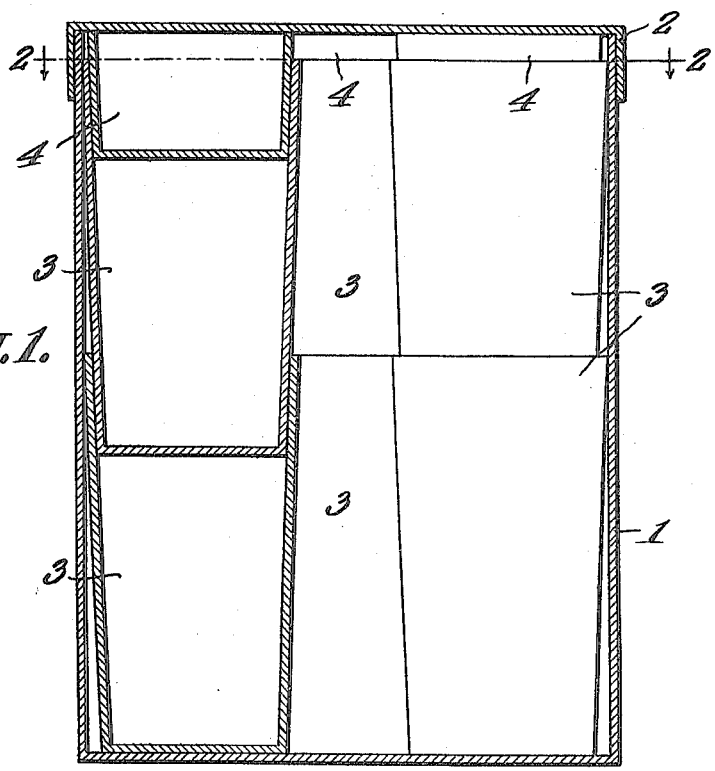
Figure 2:
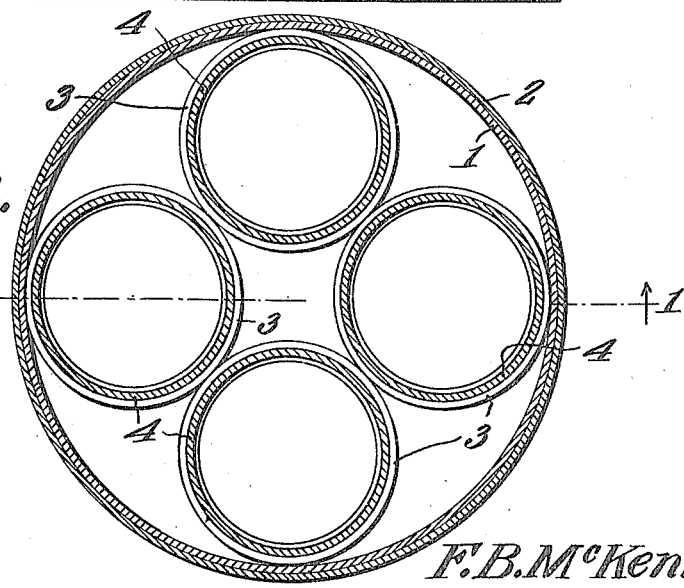

Figure 1 is a longitudinal section of the carrier, taken on the line 1—1 of Fig. 2. Fig. 2 is a cross section of the carrier, taken on the line 2—2 of Fig. 1.

In carrying out the present invention, there is provided a container or receptacle 1, which is preferably cylindrical, and is constructed of cardboard or other light material, for convenience in handling and shipping the same. The container 1 is provided with a cap or cover 2 for closing the open end thereof.

Within the container 1 are disposed a plurality of cells 3 which are in the form of tapered cups, the cells or cups being preferably coated or lined with paraffin or its equivalent, to render the same sanitary and impervious to air and light. The cells or cups are preferably constructed of a light and strong material, such as a suitable tough paper.

The cells 3 are assembled within the container 1, in a peculiar manner, they being arranged in stacks or columns, each having a plurality of superposed cells (two, as illustrated in the drawing). The upper cells have their lower or closed ends inserted or telescoped into the mouths or upper ends of the lower cells, whereby the upper cells will serve to close the lower cells, the uppermost cells having the cup-shaped stoppers or closures 4 slipped into their mouths or upper ends.

The stacks or columns are nested snugly within the container, and the columns of the cells are held between the bottom of the container 1 and the cover or cap 2 thereof, when the several parts are assembled for shipment.

The present device is adapted more particularly as a carrier for eggs, each cell 3 being arranged to hold an egg, it being noted that the uppermost cells serve as closures for the lower cells, and that the upper cells are provided with cell-like closures 4 in order that the eggs will be properly confined within the cells during transit. The several cells are sealed so as to exclude the ingress of the elements, to thereby maintain the eggs in a perfect state of preservation, should the same become broken during handling or shipment, it being observed that the cells, are lined with paraffin or the like, whereby the cells will be rendered impervious, and whereby the broken eggs will be prevented from leaking out, and may be used, by the recipient of the package or carrier.

In assembling the cells within the container, the lower cells are first inserted into the container, and snugly arranged upon the bottom thereof, and the eggs or other articles are then arranged with the lower cells, in which event the next layer of cells are inserted into the container and slipped into the open ends of the underlying cells, to close the latter, and to build up the stacks or columns of partially nested cells. The stacks or columns of cells are thus built up, and when the stacks of cells are completed, the closures 4 are applied to the uppermost cells, in which event the cover 2 may be applied to the container 1 to close the same and to enable the carrier to be wrapped or otherwise prepared for shipment. When the cover 2 is applied, the rims of the closures 4 will contact therewith, it being noted that the rims of the closures 4 project upwardly above the upper cells 3.

The present device may not only be employed as a carrier for eggs, but may be employed on a larger scale, for shipping butter and other products or commodities.

Having thus described the invention, what is claimed as new is:—

A carrier for eggs and other commodities, embodying a container, a cover therefor, a plurality of stacks of paper cells mounted within the container, and each embodying a series of tapered cells partially nested together, whereby the upper cells close the lower ones, and tapered cell-like closures seated within the open ends of the upper cells and having their rims projecting upwardly above the upper cells and contacting with the cover of the container.

In testimony that I claim the foregoing as my own, I have hereto affixed my signature in the presence of two witnesses.

FRANK B. McKENNEY.

Witnesses:
LACY GASTON,
MILDRED TROXELL.

Copies of this patent may be obtained for five cents each, by addressing the "Commissioner of Patents Washington, D. C."